United States Patent [19]
Lofredo

[11] 3,965,954

[45] June 29, 1976

[54] ANTI-ROTATIONAL DEVICE FOR BOLTS AND NUTS

[75] Inventor: Raymond A. Lofredo, Cleveland, Ohio

[73] Assignee: Industrial Innovations, Inc., Cleveland, Ohio

[22] Filed: Feb. 19, 1975

[21] Appl. No.: 550,930

[52] U.S. Cl. .................................. 151/5; 151/37
[51] Int. Cl.² ................ F16B 39/04; F16B 39/282
[58] Field of Search ............... 151/5, 6, 37, 35, 34, 151/41, 13

[56] References Cited
UNITED STATES PATENTS

| 121,176 | 11/1871 | Lamb | 151/5 X |
|---|---|---|---|
| 1,320,095 | 10/1919 | Robinson | 151/5 |
| 1,379,606 | 5/1921 | Ashley | 151/5 |
| 1,787,114 | 12/1930 | Lelean et al. | 151/5 |
| 1,899,715 | 2/1933 | Olson | 151/37 |
| 2,393,519 | 1/1946 | Crowther | 151/5 |
| 3,078,899 | 2/1963 | MacLean et al. | 151/37 |
| 3,190,334 | 6/1965 | Wigam | 151/37 |
| 3,443,616 | 5/1969 | Dey | 151/5 X |

FOREIGN PATENTS OR APPLICATIONS

| 35,106 | 2/1953 | Poland |

*Primary Examiner*—Ramon S. Britts
*Attorney, Agent, or Firm*—Baldwin, Egan, Walling & Fetzer

[57] ABSTRACT

A device for restricting or resisting rotation of an associated bolt or nut, comprising an open topped cage or receptacle having a base portion and side wall portions extending upwardly, adapted to receive a nut or the head of a bolt. Retaining means are provided on the side wall portions, disposed in overlying relation to the base, for retaining the nut or bolt in assembled relationship within the cage, and means are provided into which anchoring means is adapted to be inserted, for restricting rotation of the cage and assembled bolt or nut.

4 Claims, 14 Drawing Figures

ANTI-ROTATIONAL DEVICE FOR BOLTS AND NUTS

This invention relates in general to a fastening device adapted to restrict undesired rotation of a bolt or nut, and more particularly relates to a fastening device comprising an open topped, cage-like member for enclosing a nut or bolt head and having retaining means thereon overlying the base of the cage member for preventing inadvertent disassembly of the nut or bolt from the cage member, together with means for securing the cage member and associated bolt or nut against rotation.

BACKGROUND OF THE INVENTION

It is known in the prior art to provide a cage or receptacle for enclosing the head of a bolt or a nut, and having openings in the side walls of the cage adapted to receive anchoring means, for restricting rotation of the cage and associated nut or bolt. U.S. Pat. No. 1,379,606 issued May 31, 1921 to C. E. Ashley discloses such a device. Likewise, U.S. Pat. No. 1,915,088 issued June 20, 1933 to C. L. Eastburg, and U.S. Pat. No. 3,437,119 issued Apr. 8, 1969 to E. J. Day disclose various other arrangements for locking a threaded bolt or nut for retaining the latter in tightened condition. However, in these prior art arrangements, it is conventional for a workman to assemble the device with a bolt or nut generally on the site of use.

SUMMARY OF THE INVENTION

The present invention provides a fastener device for restraining a bolt or nut against rotation, and wherein retainer means are provided on the device for maintaining a bolt or nut in assembled relationship with the device, and without the need of assembly by a workman on site.

Accordingly an object of the invention is to provide a novel fastener device for restricting rotation of a nut or bolt without the necessity of drilling holes through the nut or bolt, and wherein the device can be expeditiously preassembled with the nut or bolt and retained in such preassembled condition.

Another object of the invention is to provide a device of the latter mentioned type wherein the retainer means comprises projections or dimples on the device and which overlie a base portion thereof, and prevent inadvertent separation of the bolt or nut from the device.

A still further object of the invention is to provide a fastener device of the aforementioned type which comprises an open topped cage including a base portion and upstanding wall portions, with the cage being adapted to encompass the bolt head or nut, and with the wall portions being yieldable relative to one another, and with the retainer means comprising projections extending into overlying relationship with respect to the base portion to thereby prevent inadvertent separation of the bolt or nut from the cage and permitting preassembly of the latter, and which includes means consisting generally of openings extending through the wall portions and through the respective projection, for receiving anchoring means to restrict rotation of the cage and associated bolt or nut.

Other objects and advantages of the invention will be apparent from the following description taken in conjunction with the accompanying drawings wherein:

DESCRIPTION OF PREFERRED EMBODIMENTS

Figure 1:
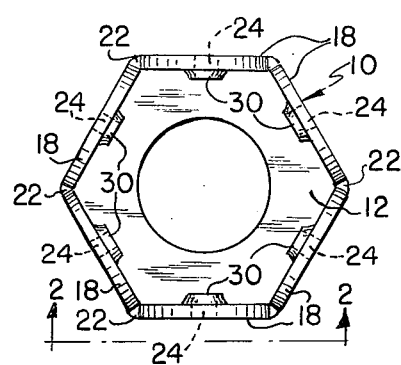
FIG. 1 is a top plan view of a device or cage-like receptacle embodying the invention.
Figure 2:
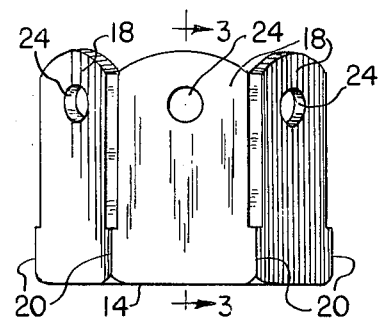
FIG. 2 is an elevational view of the device illustrated in FIG. 1 and taken generally along the plane of line 2—2 of FIG. 1 looking in the direction of the arrows.
Figure 3:
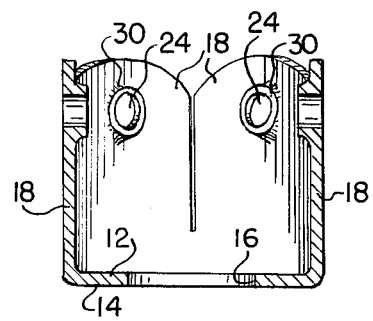
FIG. 3 is sectional view taken generally along the plane of line 3—3 of FIG. 2 looking in the direction of the arrows.

Referring now again to the drawings, reference No. 10 refers to the socket-like receptacle member or cage, which is adapted to receive a bolt or nut for the purpose of resisting rotation thereof. Cage 10 comprises a base 12 which in the embodiment illustrated in FIGS. 1 through 3 presents a generally smooth undersurface 14. Base 12 has an opening 16 located generally centrally therethrough, adapted for receiving a threaded stud, or the shank of a bolt, as illustrated for instance in FIGS. 5 and 6.

Projecting upwardly from the base 12 are side wall portions 18, which side wall portions are disposed in substantially vertical planes. In the embodiment illustrated, the device may be formed from one piece of material, say for instance sheet metal, and can be stamped out utilizing mass production operations. In the embodiment illustrated, during formation of the device, a portion of each of the side wall portions are preferably connected together to the adjacent side wall portions as at 20, adjacent the lower part of each of the side wall portions, and defining a curb section, while the upper parts or tabs of the side wall portions 18 are separated from one another even though disposed in generally juxtaposed condition, which gives considerable yieldability to the upper tab parts of the side wall portions for a purpose to be hereinafter set forth.

In the embodiment illustrated, the device has been shown as being hexagonal in plan for coaction with a similar hexagon shaped nut or bolt head. It will be understood that the device can be of any polygonal configuration for coaction with a correspondingly polygonal configuration of associated nut or bolt.

Figure 5:
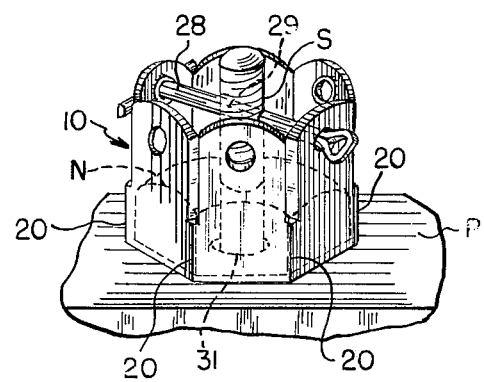
FIG. 5 is a perspective view of the device of the invention for preventing rotation of an associated nut in conjunction with a threaded stud.

Adjacent the upper end of each of the side wall portions there is provided an opening 24 through the respective side wall portion, which openings are adapted to receive some type of anchoring or fastener means, for aiding in preventing rotation of the device and associated nut or bolt, thereby preventing inadvertent loosening of the fastening bolt or nut. As can be seen in FIG. 5, the anchoring means in that embodiment is a cotter pin 28 extending through an opening 29 in stud S which is threaded into or supported on a part P engaging the undersurface of the device 10. A nut N is threaded onto the stud S, and is prevented from rotating by the aforementioned cage device 10.

As can be best seen in FIGS. 1 and 3, the aforementioned openings 24 have associated therewith an embossment or projecting portion 30, extending upwardly in overlying relationship with respect to the base portion 12 of the cage, which embossments or projections 30 are adapted to prevent inadvertent separation or disassembly of the nut or bolt from the cage. Accordingly, the cage and the associated nut or bolt can be preassembled for use as a unit, and the projections 30 prevent inadvertent disassembly. The yieldability of the upper portions of the side walls 18 permit the entry of the nut or bolt into the cage receptacle from the open top thereof, and then with the side wall portions returning to their original positions, the wrench surfaces on the nut or bolt head are disposed in close confronting relation to the respective interior surfaces of the cage, and the aforementioned projections 30 prevent free movement of the nut or bolt out of the cage. The exterior surfaces of the cage and assembled nut or bolt can be utilized to "wrench" the nut or bolt and cage assembly into threaded coaction with the respective stud or hole in the support.

Figure 4:
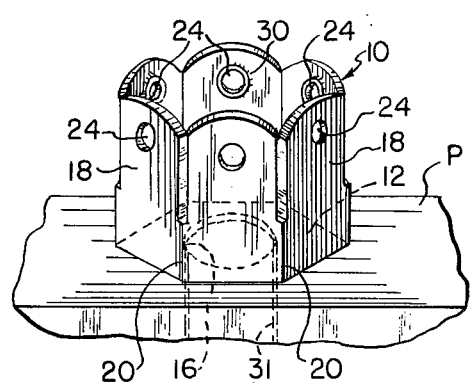
FIG. 4 is a perspective view illustrating the device of the invention as mounted on a supporting surface or part.

FIG. 4 illustrates the cage device of the invention mounted on a plate or support P, with the opening 16 in the base portion 12 thereof overlying a threaded opening 31 in the supporting plate P. The side wall portions 18 have projecting portions or embossments 30 circumscribing the respective passage 24 therethrough, and are disposed in overlying relationship with respect to the base portion 12 for preventing inadvertent disassembly or separation of the nut or bolt and the cage member, when the latter are assembled. As can be seen, at least the top defining exterior surfaces of the projections 30 are preferably downwardly sloping or obliquely oriented, so as to facilitate passage of the nut or bolt head past the projections during assembly of the nut or bolt and the cage receptacle.

Figure 6:
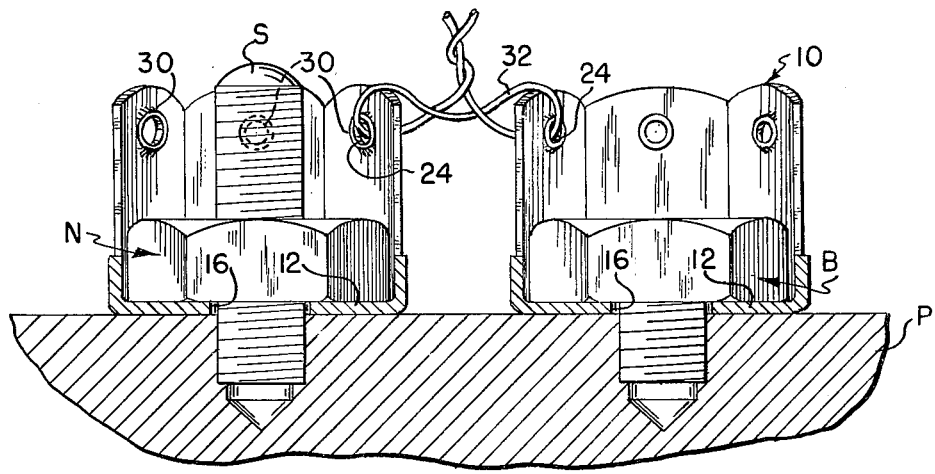
FIG. 6 is a sectional view showing a pair of the devices embodying the invention, tied together with connecting wires for resisting rotation of the associated fasteners, which in one instance is a nut coacting with a threaded stud, and in the other instance is a threaded bolt.

FIG. 6 illustrates a pair of the cages 10 of the invention, one of which is coacting with a nut N and an associated stud S, and the other of which coacts with a bolt B mounted on a support P and illustrating anchoring means 32 which in the embodiment illustrated is a piece of wire extending through one of the openings 24 in the respective cage member for securing the two cages together, and thereby preventing rotation of the cages relative to one another, thus preventing rotation of the associated nut or bolt relative to one another and to the support P.

Figure 7:
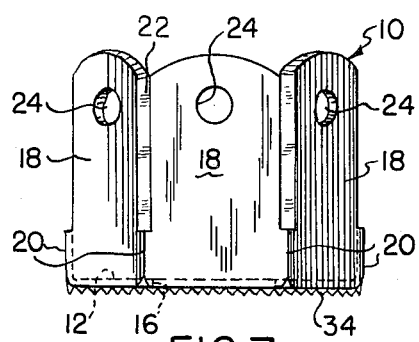
FIG. 7 is an elevational view of a device illustrating a modified arrangement.

Referring now to FIG. 7 there is illustrated a modified arrangement wherein the base 12 of the cage on its underside is provided with serrations or projections 34 which are adapted to grip the confronting surface of a support plate (e.g. P) or support surface and aid in preventing rotation of the cage and the associated nut or bolt with respect to the supporting surface, thus providing a generally locking of the cage member to the supporting surface.

Figure 8:
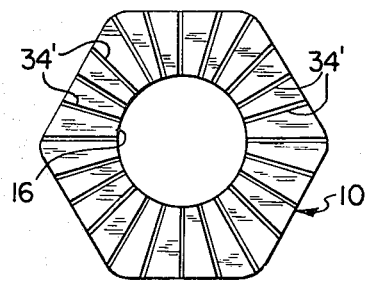
FIG. 8 is a bottom plan view of an arrangement similar to that in FIG. 7, but illustrating a further modification.

FIG. 8 shows a modified arrangement of the FIG. 7 embodiment wherein the projections on the exterior of the base comprise generally radially extending ribs 34' for accomplishing a gripping or locking of the cage 10 to a supporting surface.

Figure 9:
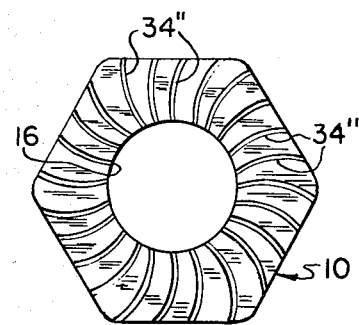
FIG. 9 is a bottom plan view showing another embodiment as compared to that of FIG. 8.

FIG. 9 discloses a further embodiment wherein the locking ribs 34" are of curved configuration, and likewise are adapted to grip or lock the cage to a supporting surface or plate.

Figure 10:
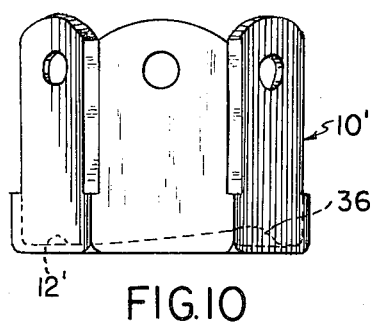
FIG. 10 is a side elevational view of a device embodying the invention and embodying a nut means formed integrally with the base thereof.

FIG. 10 illustrates an embodiment of cage 10' which embodies on the base portion 12' thereof a helical nut thread 36 (FIGS. 10 and 11) so that the cage can coact in threaded relation with a threaded stud or with the threaded shank of an associated bolt. The cage 10' can be readily formed from sheet metal, and therefore the helical thread 36 can be stamped or formed into the bottom portion at opening 16' therethrough during the forming operation.

Figure 11:
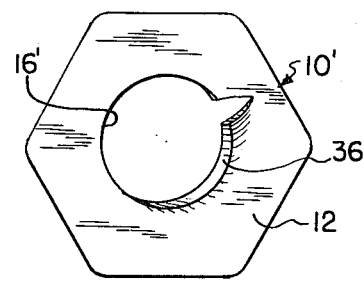
FIG. 11 is a bottom plan view of the device illustrated in FIG. 10.
Figure 12:
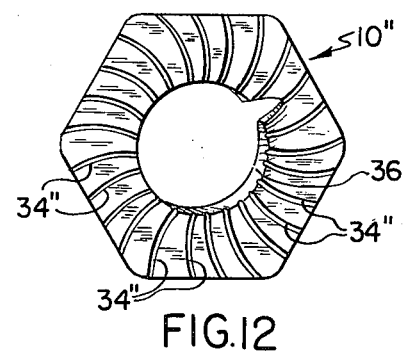
FIG. 12 is a further modified arrangement of the embodiment illustrated in FIG. 11.

FIG. 12 illustrates another embodiment of cage generally similar to that of FIGS. 10 and 11, but wherein the cage 10" in addition to having a helical thread 36 formed on the bottom portion 12 thereof, also embodies locking projections or serrations 34" such as for instance the curvilinear ribs illustrated on the cage of FIG. 9.

Figure 13:
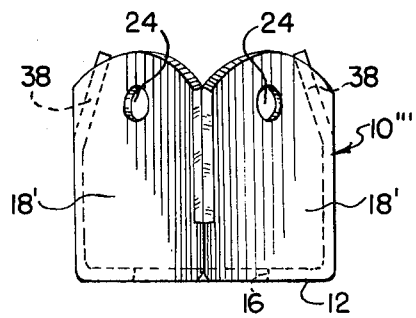
FIG. 13 is a side elevational view showing a further modification of a device embodying the invention.

FIG. 13 illustrates a further embodiment of cage 10'" wherein at least certain of the side wall portions 18' are bent or obliquely orientated adjacent their upper ends thereof and as at 38, with such obliquely orientated sections being adapted to overlie the underlying base 12 of the cage and prevent inadvertent disassembly or separation of an associated nut or bolt from the cage. In this event, the openings 24 through the upper portions of the side walls 18' do not necessarily have to embody any projecting embossments 30 or the like of the aforedescribed embodiments, since the obliquely disposed portions 38 will serve the same purpose as the embossments do in the other embodiments. The openings 24, can be used of course, to receive anchoring means for aiding in preventing rotary moement of the cage and associated nut or bolt with respect to a support.

Figure 14:
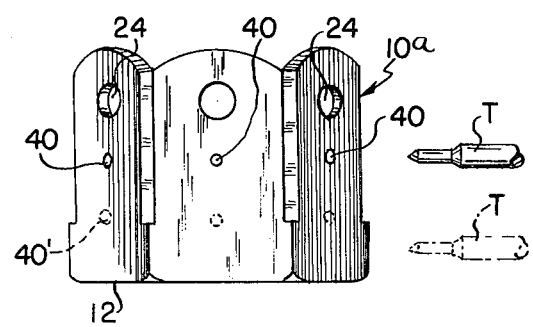
FIG. 14 is a side elevational view of a device embodying the invention formed generally similar to that of FIGS. 1 and 2, but showing an additional arrangement.

FIG. 14 illustrates another embodiment wherein the cage 10a is of the type illustrated for instance in FIGS. 1 through 3, but wherein after the nut or bolt is assembled therewith, the side wall portions 18 are punched as at 40 thereby providing indentations or projections on the inner surfaces of the side wall portions, which overlie the base 12 and prevent inadvertent disassembly or separation of the associated nut or bolt when the latter is preassembled with the cage. If the "punches" are placed for instance in the areas indicated in full lines FIG. 14, the associated nut or bolt can move a certain amount with respect to the cage and could therefore more or less "rattle around" in the cage. However, if the punches are made in the locations 40' indicated in phantom lines FIG. 14, then such punches would actually engage the nut or bolt head, and would prevent any movement of the nut or bolt with respect to the cage. It could be said therefor that with the punch marks 40' in the location indicated, there would be a substantially rigid connection betwen the nut or bolt head and the cage.

From the aforegoing discussion on the accompanying drawings, it will be seen that the invention provides a novel fastening device in the form of a cage or receptacle adapted for restricting rotation of an associated nut or bolt, and wherein the cage or receptacle has retaining means overlying the base of the device, for preventing inadvertent disassembly or separation of nut or bolt from the cage when the latter have been preassembled as a unit. The cage device embodies resilient or yieldable side wall portions so that the nut or bolt can be preassembled with the cage and move past the retaining means, whereon the side wall portions can spring or move back to their orginal non-deformed condition for retaining the nut or bolt in assembled relation with the cage.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In combination an article of manufacture comprising a locking receptacle and a bolt or nut element said locking receptacle receiving the bolt head or nut element, said locking receptacle including a base having said bolt head or nut element seated thereon and a side wall portion extending upwardly from said base encompassing and extending beyond the associated bolt head or nut element, and retainer means extending inwardly from said side wall portion in overlying relation to said bolt head or nut element for preventing free movement of the bolt head or nut element out of said locking receptacle, said side wall portion being yieldable relative to said base for facilitating entry of the bolt head or nut element into said receptacle past said retainer means, said base having a generally central opening therethrough, means for aiding in restricting rotary movement of said receptacle on a support surface about the vertical axis of said article, and wherein said article is provided from a single piece of sheet metal, said side wall portion comprising an upwardly projecting unitary curb section and separate tab sections extending upwardly vertically from said curb section, each of said tab sections being in generally abutting relationship with adjacent tab sections along the sides thereof and including means readily permitting said tab sections to be individually resiliently yieldable in a generally radial direction toward and away from said axis for providing said ease of insertion of the associated bolt head or nut element past said retaining means, each of said tab sections having an opening therethrough for receiving a locking key, said retaining means comprising an embossment on the respective tab section circumscribing the respective opening through the tab section and extending inwardly into overlying relation to said bolt head or nut element, the bolt head or nut element being received in generally close fitting coaction with said side wall portion whereby the bolt head or nut can not be rotated about said axis without turning of said receptacle, the last mentioned opening comprising said rotary restricting means and being adapted to receive an anchoring member therethrough, such as for instance the aforementioned locking key.

2. An article in accordance with claim 1 including a plurality of serrations on the exterior of said base adapted for gripping coaction with a support for aiding in restricting rotary movement of the receptacle on the support.

3. An article in accordance with claim 1 wherein said base includes means coacting with said central opening for threading said receptacle onto an associated threaded stud member.

4. An article in accordance with claim 1 wherein said article is of polygonal configuration in plan with said side wall portion comprising a plurality of separately yieldable side-by-side sections to provide the article with expandability in a direction generally radially from said vertical axis, for entry of the element past said retainer means.

* * * * *